(12) United States Patent
Veillette

(10) Patent No.: US 8,095,793 B1
(45) Date of Patent: Jan. 10, 2012

(54) DIGITAL RIGHTS MANAGEMENT APPARATUS AND METHOD

(75) Inventor: Mario Veillette, Trois-Rivieres (CA)

(73) Assignee: In-Circuit Solutions Inc., Saint-Hubert, Quebec (CA)

( * ) Notice: Subject to any disclaimer, the term of this patent is extended or adjusted under 35 U.S.C. 154(b) by 0 days.

(21) Appl. No.: 12/650,071

(22) Filed: Dec. 30, 2009

(51) Int. Cl.
*H04L 9/32* (2006.01)

(52) U.S. Cl. ...................................... 713/168

(58) Field of Classification Search ............... None
See application file for complete search history.

(56) References Cited

U.S. PATENT DOCUMENTS

| | | | |
|---|---|---|---|
| 6,901,385 B2 | 5/2005 | Okamoto | |
| 7,016,498 B2 * | 3/2006 | Peinado et al. | 380/277 |
| 7,062,045 B2 | 6/2006 | Riddick | |
| 7,080,039 B1 | 7/2006 | Marsh | |
| 7,239,704 B1 * | 7/2007 | Maillard et al. | 380/210 |
| 7,493,289 B2 | 2/2009 | Verosub | |
| 7,536,563 B2 | 5/2009 | Fransdonk | |
| 7,634,664 B2 | 12/2009 | Ibrahim | |
| 2006/0020783 A1 * | 1/2006 | Fisher | 713/156 |
| 2008/0168568 A1 | 7/2008 | Brodersen | |

* cited by examiner

*Primary Examiner* — Brandon Hoffman

(57) ABSTRACT

Apparatus and method for preventing unauthorized usage of a digital content, without requiring a form of copy protection for the distributed media. The distributed digital content is first decrypted, within a digital rights management device, to be re-encrypted for the digital content processing device. The digital content unique decryption key is not shared with the digital content processing device, and is obtain from a secure device communicating securely, using encryption, with the digital rights management device. The unique encryption key used to re-encrypt the digital content, so that it can only be decrypted by the digital content processing device, is obtained, from the digital content processing device, in an encrypted format unknown to the digital content processing device.

20 Claims, 15 Drawing Sheets

DIGITAL RIGHTS MANAGEMENT APPARATUS AND METHOD

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF THE INVENTION

This invention relates to the field of managing digital rights and preventing media and software piracy on computers, media players and other devices.

BACKGROUND OF THE INVENTION

Nowadays, with the software registration and activation schemes that the software providers have developed, software piracy is mostly done by changing one or many files from their original contents.

There are software authentication devices available, but they can mostly be defeated by slightly modifying part of the software required to use them.

There are digital rights management methods used by some device manufacturers and media providers, but they are either easily defeated because they mostly rely on a portion of software for protection, or they are too restrictive to be easily acceptable to licensees.

Other digital rights management methods rely on an encryption key that has to be shared with all digital content providers and all digital content processing device manufacturers. This renders the key somewhat vulnerable.

Still as we speak, software piracy and media piracy is still done by simply making a copy of the files.

Consequently a need has arisen for a better method and apparatus to prevent this piracy.

There was a need for a method where no copy protection mechanism is required. There was a need for a method where a digital content decryption key does not need to be shared with the digital content processing device manufacturers.

There was a need for a method where all digital contents can use their own encryption keys and where keys are kept secret in a secure container like a smart card.

There was a need for a method which supports media containing unprotected digital content, for home content, demonstration, promotion, installing applications, debugging and other purposes, along with protected digital content.

There was a need for a method which offers a solution to ease production and distribution by allowing media to be identical when distributed.

There was a need for a method which allows for licensing so that a digital content can be used in all compatible media players or computers. At the same time, the method had to allow for licensing so that a digital content can only be used on one media player or computer. The method also had to allow for licensing to be easily ported from one media player or computer to another media player or computer, if authorized by the digital content provider.

Furthermore, one embodiment, in accordance with the presented method, does not require a network connection to use or license a digital content, so that the digital content can be used right out of the box.

SUMMARY

In accordance with one embodiment of the invention, a tamper-resistant digital rights management device (DRMD) is used to protect an encryption key used by a digital content provider, to encrypt a digital content. This key is either stored internally to the DRMD or, externally to the DRMD, in another tamper-resistant secure device, like a smart card.

The DRMD is installed inside a digital content processing device, like a media player or a computer, and communicates with the digital content processing device.

The DRMD can also communicate securely with an external tamper-resistant secure device, like a smart card.

The DRMD decrypts an encrypted digital content and re-encrypts it so that it can only be decrypted by the digital content processing device linked with it.

The digital content is re-encrypted by the DRMD, using a key obtained from a digital certificate stored on the digital content processing device.

The key to decrypt the digital content is either obtained when licensing the digital content, via a communication established between the DRMD and the digital content provider, or directly when purchasing a digital content media which comes with a tamper-resistant secure device like a smart card.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention.

Definitions

The following definitions are offered for purposes of illustration, not limitation, in order to assist with understanding the discussion that follows.

Digital content: Any digital information. This information may represent software, music, images, a movie, a book or any form of multimedia composition.

Secure device: A tamper-resistant device with encryption capabilities and non-volatile memory like a type of smart card or security token.

Digital content processing device: An apparatus which reads a digital content and uses its data in a particular manner depending on the type of data or the type of apparatus. All types of media player and computers are digital content processing devices.

Digital rights management: A generic term used for access control technologies that can be used to control usage of digital content.

Digital rights management authority: Global organization responsible for digital rights management.

Digital signature: A mathematical scheme for demonstrating the authenticity of a digital message or document.

Description

Figure 1:
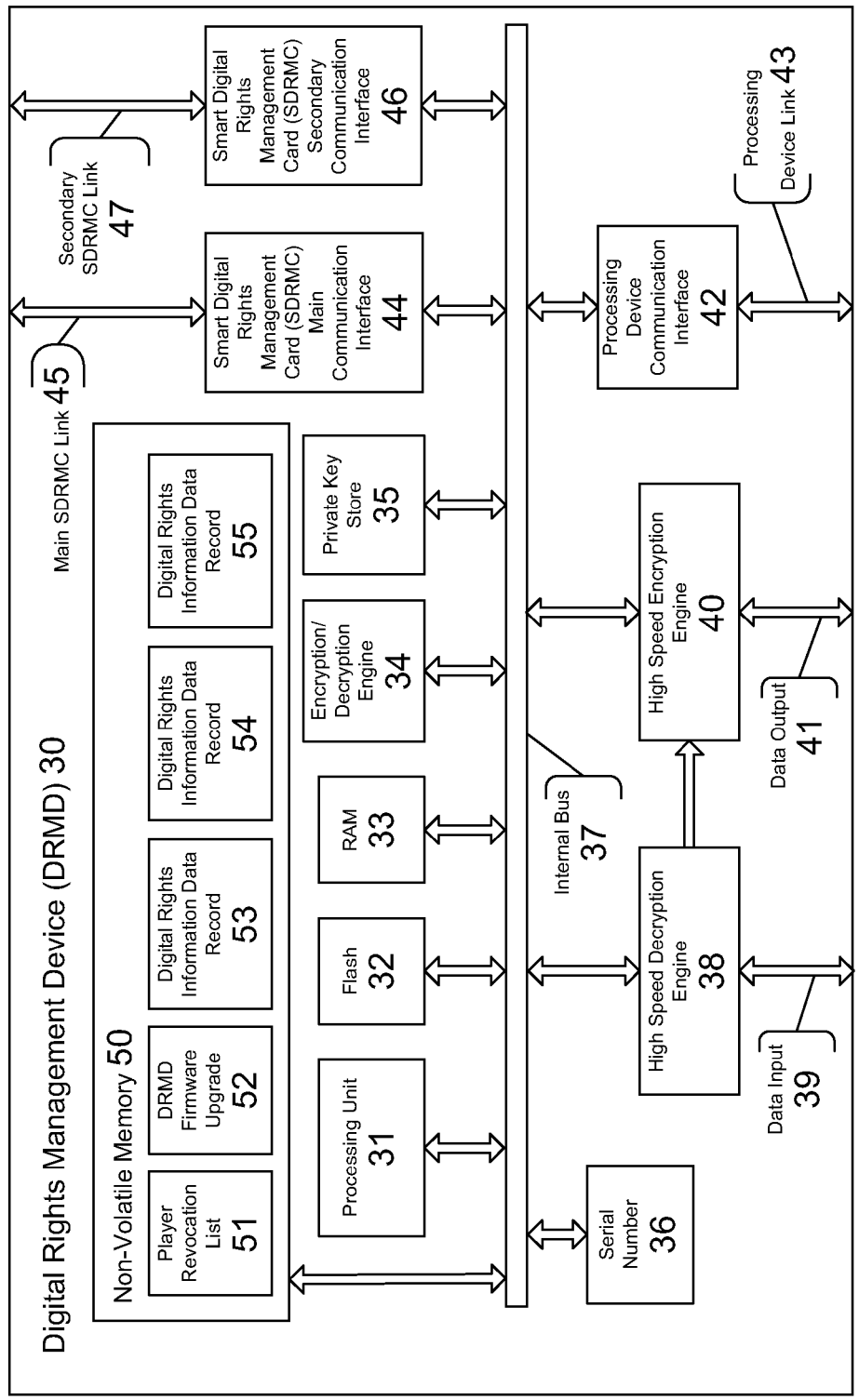
FIG. 1 shows a block diagram of a digital rights management device in accordance with one embodiment of the present invention.

FIG. 1 shows a block diagram of a digital rights management device in accordance with one embodiment of the present invention. A digital rights management device (DRMD) 30 is used to decrypt an encrypted digital content received on its data input link 39. To decrypt the encrypted digital content, the DRMD uses a high speed decryption engine 38, and a private decryption key. The decrypted digital content is then re-encrypted by a high speed encryption engine 40, using a private encryption key. The newly encrypted digital content is then put on a data output link 41. This insures that the decrypted digital content is only present inside the DRMD.

The encrypted digital content private decryption key is obtained from a digital rights information data record (DRIDR). The DRMD may hold some of these DRIDRs. In this diagram, the non-volatile memory 50 contains DRIDR 53, DRIDR 54 and DRIDR 55. These DRIDRs may also be located inside an external smart digital rights management card (SDRMC). The DRMD supports 2 SDRMCs. The DRMD communicates with the first SDRMC using a smart digital rights management card main communication interface 44. The DRMD communicates with the second SDRMC using a smart digital rights management card secondary communication interface 46. To provide security, a main SDRMC link 45 uses encryption to communicate with the external SDRMC. As well, a secondary SDRMC link 47 also uses encryption to communicate with the external SDRMC.

The private encryption key, used by the high speed encryption engine 40, to encrypt the decrypted digital content, is obtained via a processing device communication interface 42. This key is obtained in a digital certificate received, from a digital content processing device linked to the DRMD, via a processing device link 43.

The non-volatile memory 50 holds a player revocation list 51. The player revocation list is used to disable generating digital content for players which have been somehow compromised. The list stored in the DRMD is the most recent list received by the DRMD. The list has to be distributed with the encrypted digital content in order for the digital content to be decrypted by the DRMD. The list can only be produced by the digital rights management authority (DRMA). The DRMA is responsible for transmitting the player revocation list to the digital content providers.

The non-volatile memory 50 also holds a DRMD firmware upgrade 52. The DRMD firmware upgrade is used to upgrade the DRMD running firmware if it is newer than the current running firmware. The firmware upgrade stored in the DRMD is the most recent firmware upgrade received by the DRMD. The firmware upgrade has to be distributed with the encrypted digital content in order for the digital content to be decrypted by the DRMD. The firmware upgrade can only be produced by the DRMA. The DRMA is responsible for transmitting the firmware upgrade to the digital content providers.

An encryption/decryption engine 34 is used for some of the encryption and decryption functions of the DRMD. Private encryption and decryption keys are held in a private key store 35. There is a private encryption key used for the encryption between the DRMD and the SDRMCs. There is another private encryption key used for communication with the DRMA. There is another private encryption key used to decrypt the decryption keys obtain from the DRIDRs. There is another private encryption key used to validate the digital certificate received from the digital content processing device. There is another private encryption key used to decrypt the encryption key obtain from the digital certificate received from the digital content processing device. There is another private encryption key used to validate and decrypt the player revocation list received from the digital content processing device. There is another private encryption key used to validate and decrypt the DRMD firmware upgrade received from the digital content processing device.

A processing unit 31 manages all the interactions between the different elements of the DRMD. It runs code from a flash memory 32 and uses a RAM memory 33 to store data. It also uses an internal bus 37 to communicate with all the internal elements of the DRMD. The DRMD also contains a serial number 36 to identify the DRMD to the DRMA. The serial number is also used in decrypting the encrypted digital content decryption keys when they come from internal DRIDRs.

Figure 2:
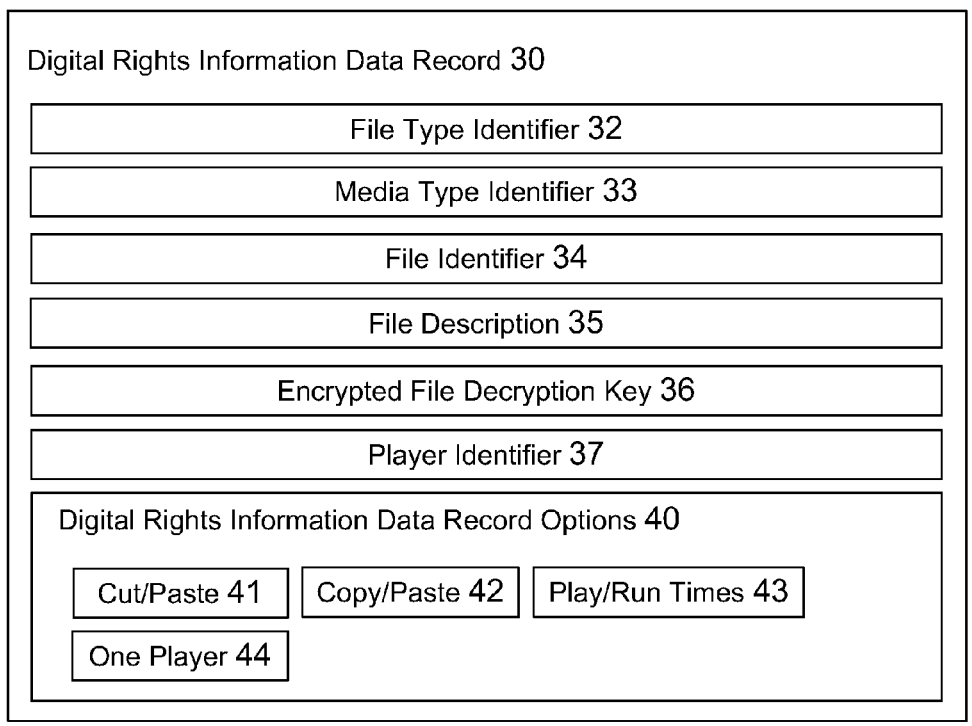
FIG. 2 shows a diagrammatic representation of a digital rights information data record content in accordance with one embodiment of the present invention.

FIG. 2 shows a diagrammatic representation of a digital rights information data record content in accordance with one embodiment of the present invention. A digital rights information data record (DRIDR) 30 is made of a file type identifier 32 identifying the file as a DRIDR.

The DRIDR also contains a media type identifier 33 identifying the type of digital content associated with this DRIDR. This is required because a digital content processing device may have limited functionalities and not support all types of digital content.

The DRIDR also contains a file identifier 34 which identifies the digital content. The file identifier may be unique to one file or shared by many files on a distributed media. The file identifier may also be set to 0 to identify that the digital content is not protected and not encrypted.

The DRIDR also contains a file description 35 containing a text string describing the digital content. This can be used for DRIDR management.

The DRIDR also contains an encrypted file decryption key 36 which is an encrypted version of the decryption key required to decrypt the digital content associated with the file identifier 34. If the DRIDR is stored in a smart digital rights management card (SDRMC), the encrypted file decryption key is encrypted using both, a private encryption key, and the SDRMC serial number. If the DRIDR is stored in a digital rights management device (DRMD), the encrypted file decryption key is encrypted using both, the private encryption key, and the DRMD serial number. The private encryption key is only known to the digital rights management authority (DRMA) and the DRMD. This insures that, even if a SDRMC is somehow compromised, the real decryption key for the digital content is not revealed.

The DRIDR also contains a player identifier 37. The player identifier may be set to 0 when it is unknown and required to be set on a first usage. The player identifier may be irrelevant in some cases where the digital content is allowed to be used in more than one digital content processing device. Otherwise it identifies the digital content processing device where the digital content can be used. This is a unique identifier which has been provided by the DRMA to the digital content processing device manufacturer. The player identifier has been provided with a unique decryption key and a digital certificate that the digital content processing device has to send to the DRMD.

The DRIDR also contains a digital rights information data record options (DRIDRO) 40 section. The DRIDRO contains a cut/paste 41 option which may be set to allow cut and paste of the DRIDR to another SDRMC or DRMD. This would be used to port a DRIDR from one SDRMC to another SDRMC or from one digital content processing device to another digital content processing device. The DRIDRO contains a copy/paste 42 option which may be set to allow copy and paste of the DRIDR to another SDRMC or DRMD. This parameter may be set to allow a specific number or copies of the DRIDR to be made, so that the digital content can be used in more than one digital content processing device at the same time. The DRIDRO contains a play/run times 43 option which may be set to allow playing or running only a specific number of times. Finally, the DRIDRO contains a one player 44 option which may be used to restrict the usage of the digital content to only one digital content processing device. In that case, the selected digital content processing device is the one defined in the player identifier 37.

Figure 3:
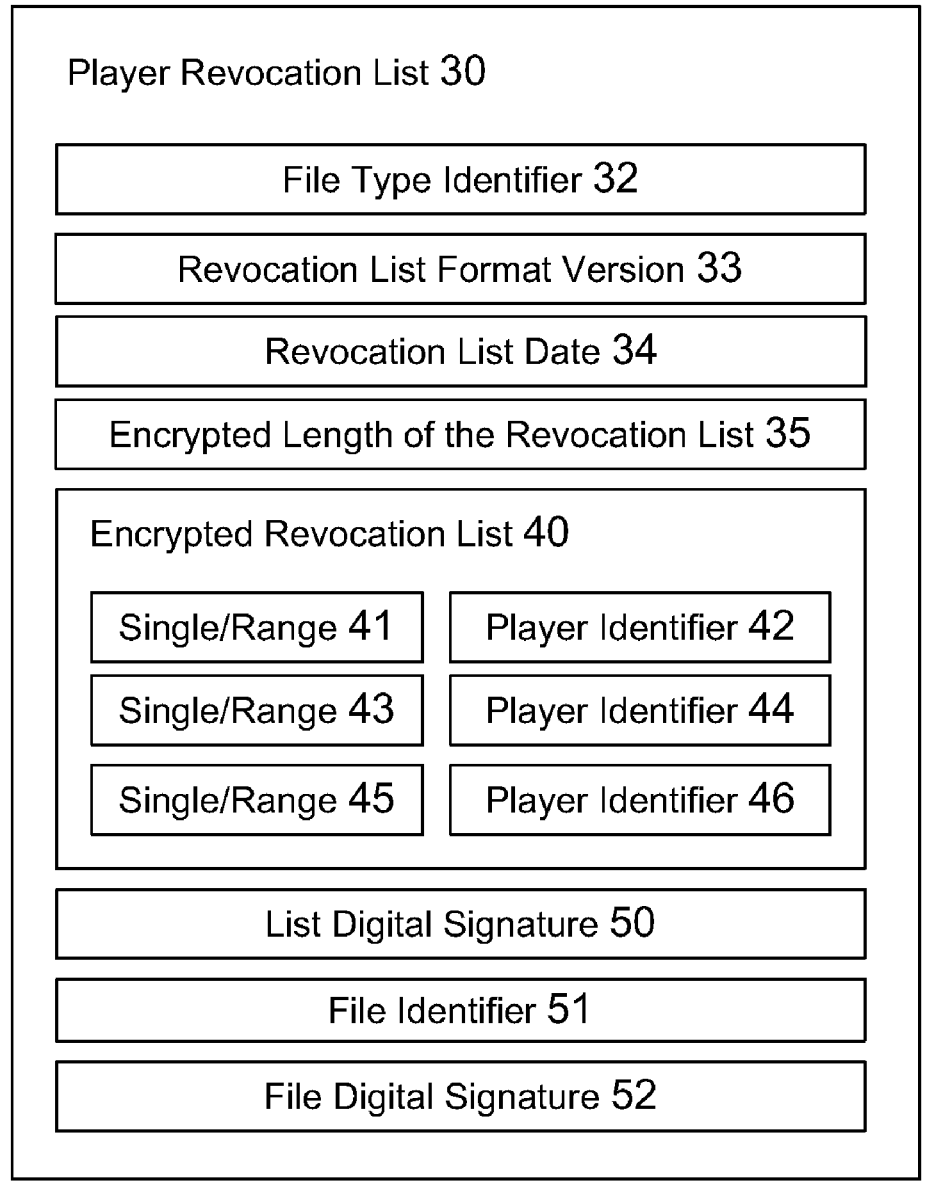
FIG. 3 shows a diagrammatic representation of a digital content processing device revocation list content in accordance with one embodiment of the present invention.

FIG. 3 shows a diagrammatic representation of a digital content processing device revocation list content in accordance with one embodiment of the present invention. A player revocation list (PRL) 30 is made of a file type identifier 32 identifying the file as a PRL.

The PRL also contains a revocation list format version 33 identifying the format version of the list in case the format is changed. A digital rights management device (DRMD) receiving the file needs to be aware of the format it is receiving.

The PRL also contains a revocation list date 34 so that the DRMD knows the date of the revocation list and can upgrade its revocation list, if the list is newer than the list it already has stored.

The PRL also contains an encrypted length of the revocation list 35 so that the revocation list length can be known to the DRMD but remain secret. The length may be set to 0 if there are no digital content processing devices on the list.

The PRL also contains an encrypted revocation list 40 containing the digital content processing devices which rights have been revoked because they were somehow compromised. The list is made of a single/range flag determining whether the following player identification is concerning a single digital content processing device or is part of a range of digital content processing devices. For example, in this figure, single/range 41 is associated with player identifier 42 to determine if the digital content processing device, whose identification number is player identifier 42, is a single digital content processing device or is part of a range of digital content processing devices ending with the following entry in the list. The same applies for single/range 43, player identifier 44, single/range 45 and player identifier 46.

The PRL also contains a list digital signature 50 in order to make sure that the list has not been altered. The list was produced by the digital rights management authority (DRMA) and the digital signature can only be produced by the DRMA. The DRMD uses the digital signature to validate the list.

The PRL then contains a file identifier 51 which is the digital content file identifier associated with this revocation list. This insures that the digital content provider has put the list on the media along with the digital content.

Finally, the PRL contains a file digital signature 52 produced using a hash function and the encryption key used to encrypt the digital content. This insures that the PRL accompanying the digital content has been packaged by the digital content provider, for this particular digital content, and has not been altered.

The DRMD will not decrypt the digital content unless it has received the revocation list associated with the digital content file identifier.

Figure 4:
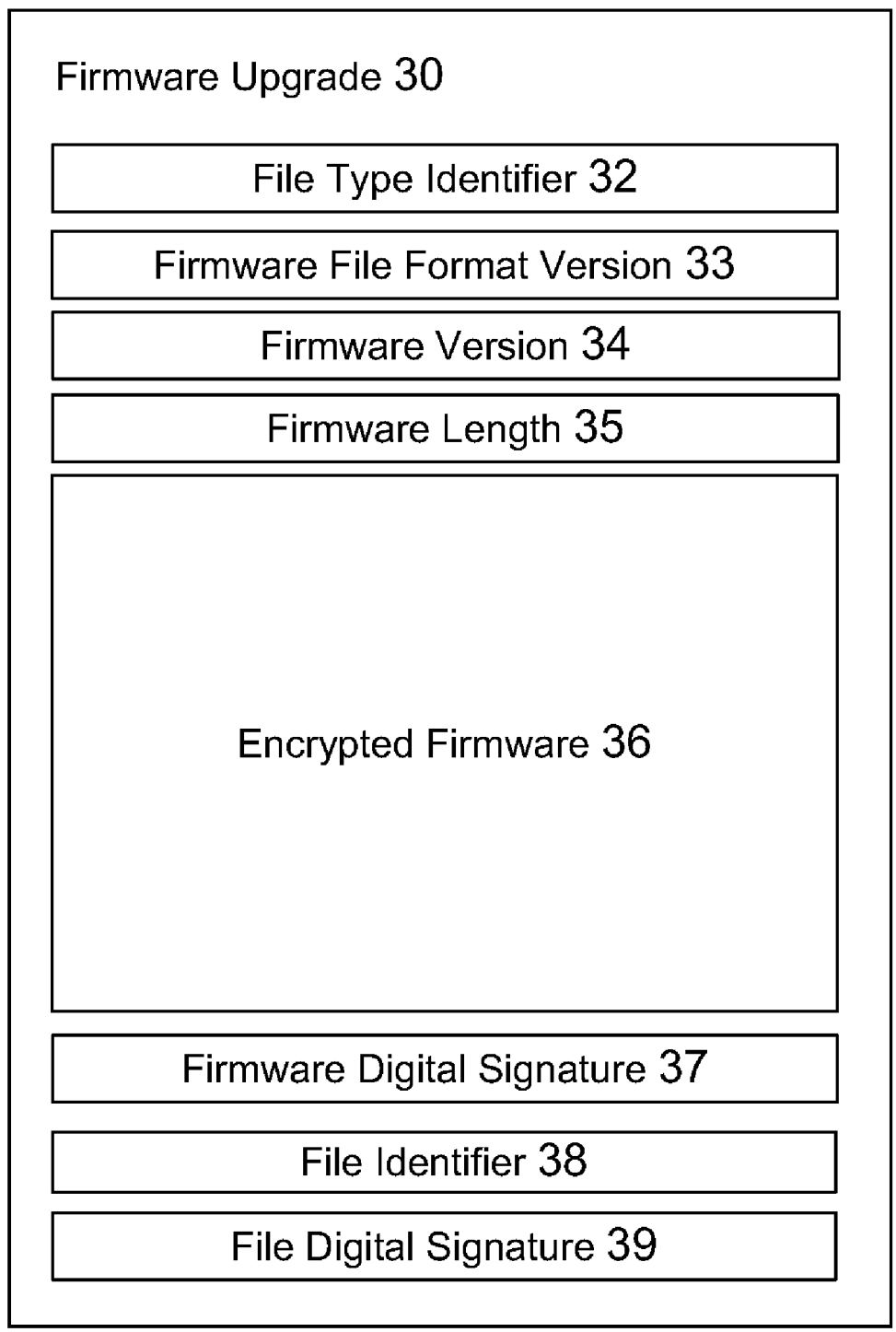
FIG. 4 shows a diagrammatic representation of a digital rights management device firmware upgrade content in accordance with one embodiment of the present invention.

FIG. 4 shows a diagrammatic representation of a digital rights management device firmware upgrade content in accordance with one embodiment of the present invention. A firmware upgrade (FU) 30 is made of a file type identifier 32 identifying the file as a FU.

The FU also contains a firmware file format version 33 identifying the format version of the firmware upgrade file in case the format is changed. A digital rights management device (DRMD) receiving the file needs to be aware of the format it is receiving.

The FU also contains a firmware version 34 so that the DRMD knows the version of the firmware upgrade and can upgrade its firmware if the firmware is newer than the firmware currently running. The FU also contains a firmware length 35 so that the firmware length can be known to the DRMD. The length may set to 0 if there is no firmware upgrade.

The FU then contains an encrypted firmware 36 for the DRMD.

The FU also contains a firmware digital signature 37 in order to make sure that the firmware upgrade has not been altered. The firmware upgrade was produced by the digital rights management authority (DRMA), and the digital signature can only be produced by the DRMA. The DRMD uses the signature to validate the firmware upgrade content.

The FU then contains a file identifier 38 which is the digital content file identifier associated with the firmware upgrade. This insures that the digital content provider has put the firmware upgrade on the media along with the digital content.

Finally, the FU contains a file digital signature 39 produced using a hash function and the encryption key used to encrypt the digital content. This insures that the FU accompanying the digital content has been packaged by the digital content provider, for this particular digital content, and has not been altered.

The DRMD will not decrypt the digital content unless it has received the firmware upgrade associated with the digital content file identifier.

Figure 5:
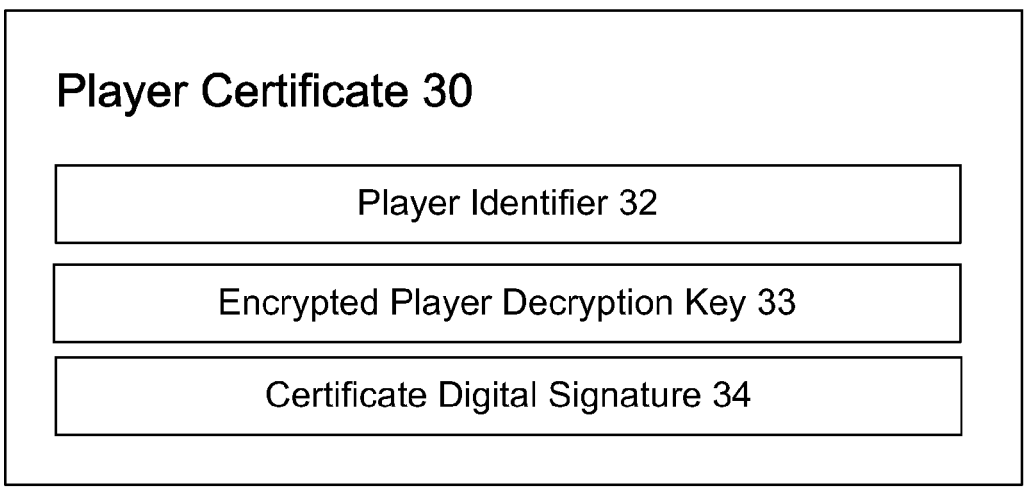
FIG. 5 shows a diagrammatic representation of a digital content processing device certificate content in accordance with one embodiment of the present invention.

FIG. 5 shows a diagrammatic representation of a digital content processing device certificate content in accordance with one embodiment of the present invention. The player certificate 30 is made of a player identifier 32 identifying the digital content processing device associated with the player certificate.

The player certificate also contains an encrypted player decryption key 33 so that a digital rights management device (DRMD), which receives this player certificate, has the encryption key to encrypt the digital content for this particular digital content processing device.

Finally, the player certificate contains a certificate digital signature 34 so that the certificate can be verified by the DRMD. Only the digital rights management authority (DRMA) can produce a player certificate. The player certificate is sent to the digital content processing device manufacturer along with a unique decryption key associated with the player certificate. The player certificate is unique to one digital content processing device.

Figure 6:
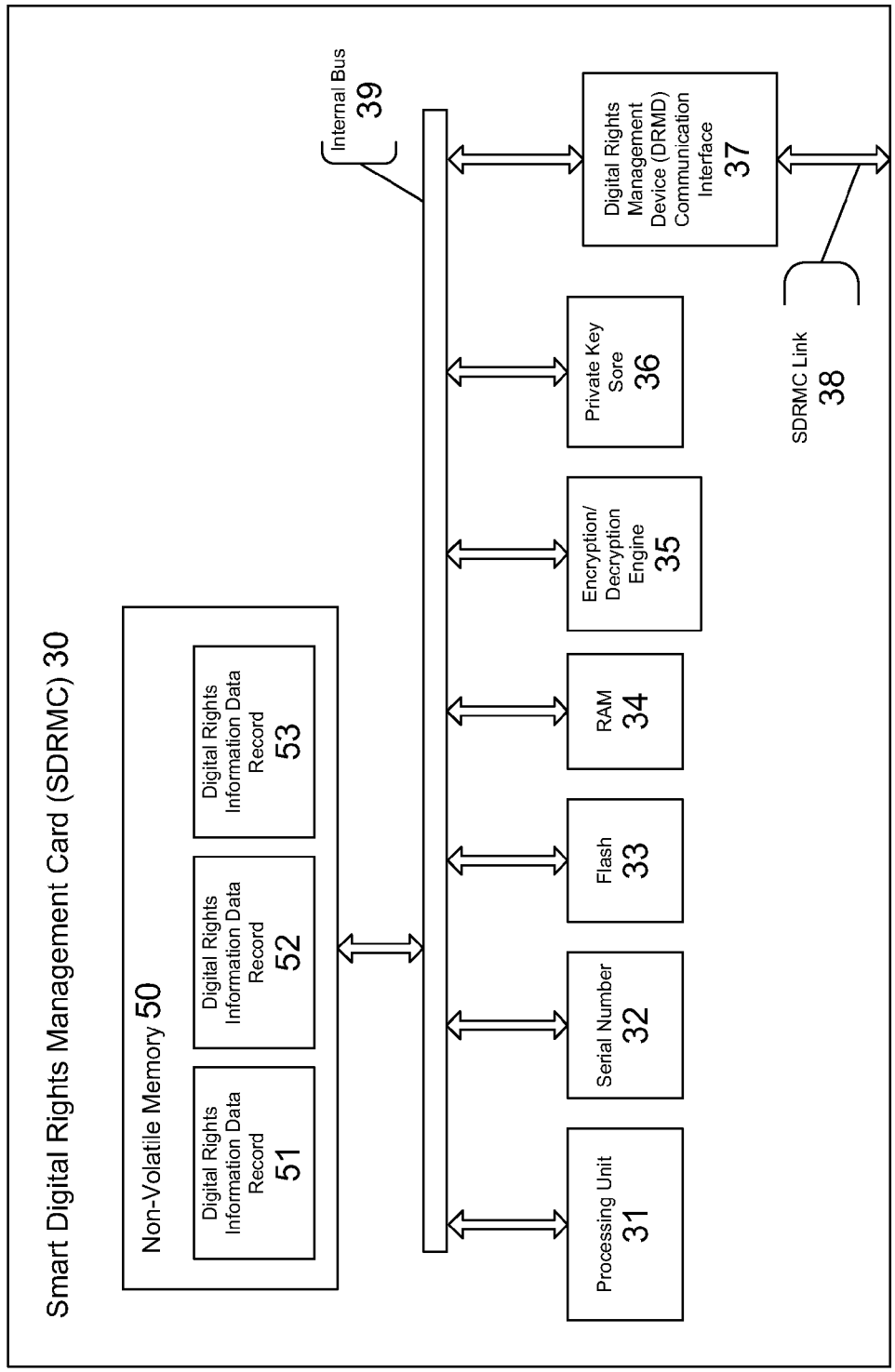
FIG. 6 shows a block diagram of a smart digital rights management card in accordance with one embodiment of the present invention.

FIG. 6 shows a block diagram of a smart digital rights management card in accordance with one embodiment of the present invention. A smart digital rights management card (SDRMC) 30 is used to securely store digital rights information data records (DRIDR).

The SDRMC uses its digital rights management device communication interface 37 to communicate with a digital rights management device (DRMD). A SDRMC link 38 uses encryption to communicate with the external DRMD.

The encryption/decryption engine 35 is used for the encryption and decryption required to communicate with the DRMD and with the digital rights management authority (DRMA). The SDRMC communicates with the DRMA via the DRMD and a linked digital content processing device.

Private encryption and decryption keys are held in a private key store 36. There is a private encryption key used for the encryption between the DRMD and the SDRMC. There is another private encryption key used for communication with the DRMA.

A non-volatile memory 50 holds the non-volatile data required by the SDRMC. The non-volatile memory holds the digital rights information data records (DRIDR). In this block diagram, for example, the non-volatile memory 50 holds a DRIDR 51, a DRIDR 52 and a DRIDR 53.

A processing unit 31 manages all the interactions between the different elements of the SDRMC. It runs code from a flash memory 33 and uses a RAM memory 34 to store data. It also uses an internal bus 39 to communicate with all the internal elements of the SDRMC. The SDRMC also contains a serial number 32 to identify the SDRMC to the DRMA. The serial number is also used, by the linked DRMD, in decrypting the encrypted digital content decryption keys when they come from the DRIDRs of the SDRMC.

Figure 7:
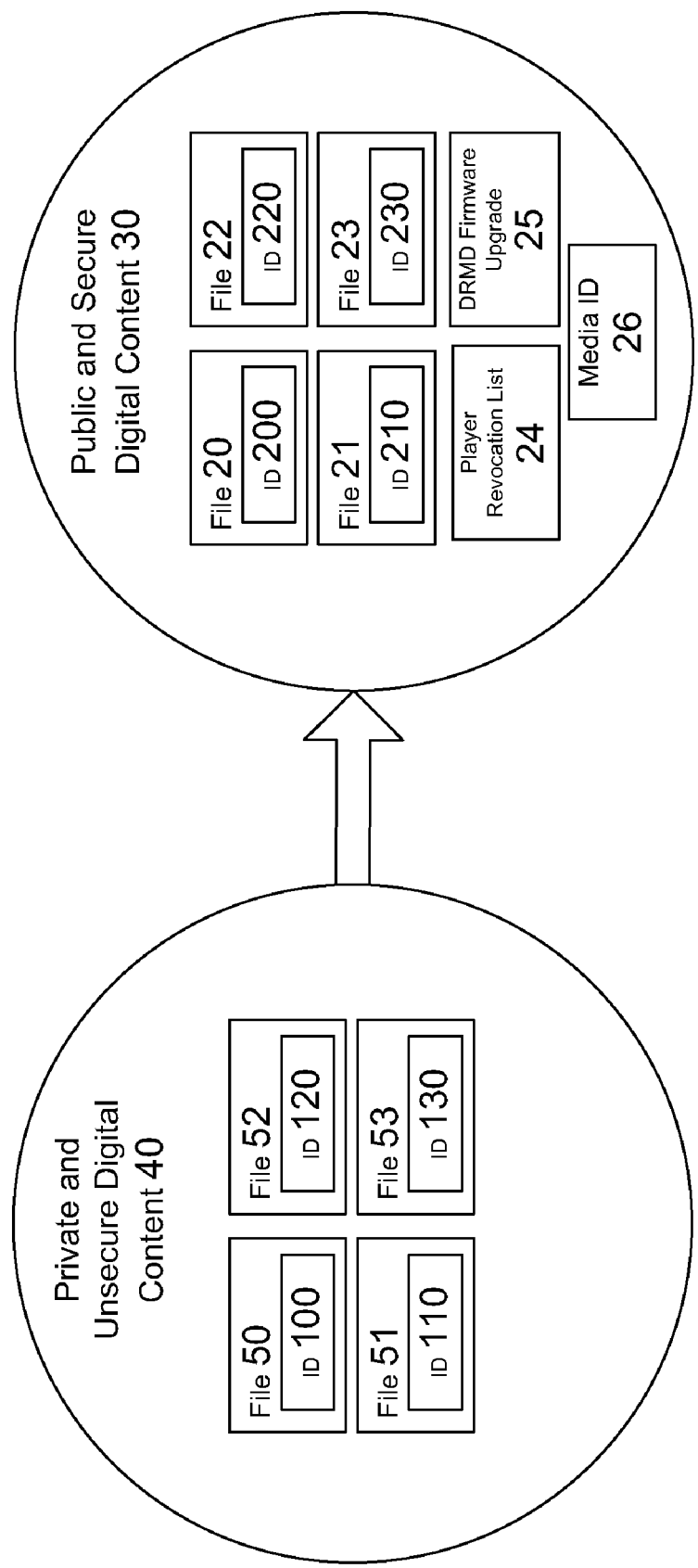
FIG. 7 shows a block diagram of the process required to produce a public and secure digital content in accordance with one embodiment of the present invention.

FIG. 7 shows a block diagram of the process required to produce a public and secure digital content in accordance with one embodiment of the present invention. A private and unsecure digital content 40 contains a file 50, which contains a file identifier 100. The private and unsecure digital content also contains a file 51, which contains a file identifier 110. The private and unsecure digital content also contains a file 52, which contains a file identifier 120. Finally, the private and unsecure digital content contains a file 53, which contains a file identifier 130.

These file identifiers have been selected by a digital content provider amongst a bank of file identifiers acquired from the digital rights management authority (DRMA). This is to insure that there are no file identifier undesired duplicates. The digital content provider may decide to use the same file identifier for more than one file, if they belong together as far as the digital content provider is concerned. The digital content provider may also decide that one or more files can be used without requiring any digital rights management. Then the digital content provider assigns a file identifier of 0 to these files. These file identifiers are put in a file header which is never encrypted.

To produce a public and secure digital content 30, the digital content provider encrypts all the files which have a file identifier other than 0, using a unique encryption key for each distinct file identifier. The file headers, containing the file identifiers, are never encrypted.

In this example, the file 50 is encrypted to produce a file 20, and a file identifier 200 is equal to the file identifier 100. The file 51 is encrypted to produce a file 21, and a file identifier 210 is equal to the file identifier 110. The file 52 is encrypted to produce a file 22, and a file identifier 220 is equal to the file identifier 120. A file 23 containing a file identifier 230 is the same as the file 53 containing the file identifier 130 because the digital content provider has decided to provide this content without digital rights management. The selected file identifier is set to 0 for the file 53.

The digital content provider then assembles a player revocation list 24, using the latest player revocation list provided by the DRMA, and the other elements, as described in FIG. 3. The digital content provider then adds the player revocation list to the public and secure digital content.

The digital content provider then assembles a DRMD firmware upgrade 25, using the latest DRMD firmware upgrade provided by the DRMA, and the other elements, as described in FIG. 4. The digital content provider then adds that DRMD firmware upgrade to the public and secure digital content.

The digital content provider then assigns a media identifier 26 to the media. This identifier can be used to identify the distributed media and its content.

Figure 8:
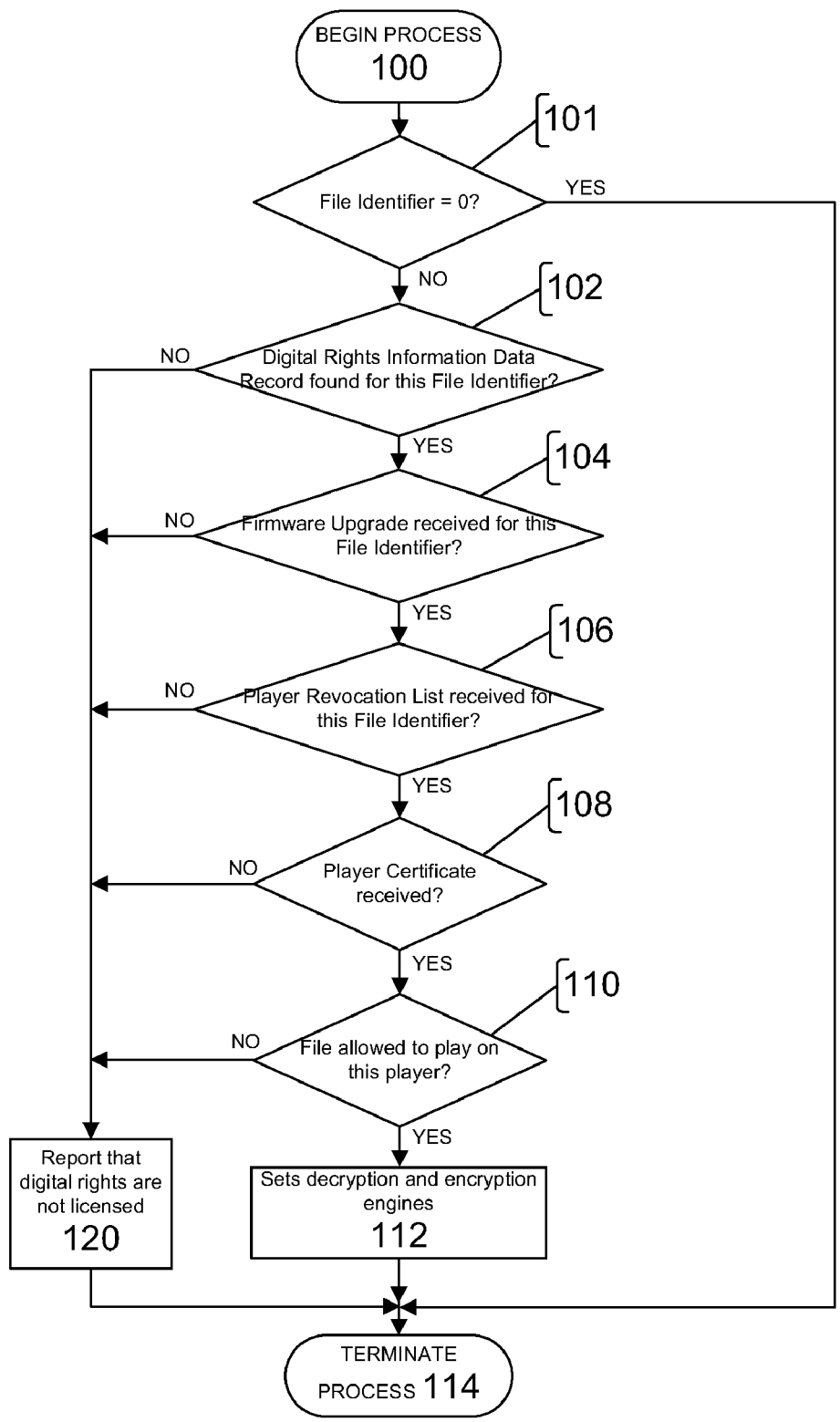
FIG. 8 shows a flowchart of a portion of the main decision process used by a digital rights management device to setup its decryption and encryption engines in accordance with one embodiment of the present invention.

FIG. 8 shows a flowchart of a portion of the main decision process used by a digital rights management device to setup its decryption and encryption engines in accordance with one embodiment of the present invention. The process begins at step 100 and proceeds to step 101. At step 101, the process determines if the file identifier received to process the digital content file is equal to 0. It this is the case then the digital content file is not encrypted and the process is terminated as shown in step 114. However, if the file identifier received is not equal to 0, the process continues to step 102. At step 102, the process determines if the digital rights information data record (DRIDR) can be found for this file identifier. This DRIDR may be located inside the digital rights management device (DRMD) non-volatile memory, or in a smart digital rights management card (SDRMC) connected to the DRMD. If the DRIDR is not found then the process continues to step 120. However, if the DRIDR is found, the process continues to step 104. At step 104, the process determines if a firmware upgrade, intended for the DRMD, has been received for the file identifier in process. If the firmware upgrade has not been received then the process continues to step 120. However, if the firmware upgrade has been received, the process continues to step 106. At step 106, the process determines if the player revocation list has been received for the file identifier in process. If the player revocation list has not been received then the process continues to step 120. However, if the player revocation list has been received, the process continues to step 108. At step 108, the process determines if the player certificate has been received. If the player certificate has not been received then the process continues to step 120. However, if the player certificate has been received, the process continues to step 110. At step 110, the process determines if the file is allowed to play on this player or digital content processing device. At this point many items are considered. The DRIDR must allow this digital content to be played on this player, the received firmware upgrade must be valid, the received revocation list must be valid, the player certificate must be valid and the player must not belong to the revocation list. If all of that is true then the process continues to step 112. Otherwise, the process continues to step 120. At step 112, the process sets the decryption and encryption engines, and the process is terminated as shown in step 114.

Whenever the process gets to step 120, it reports that the digital rights are not licensed and the process is terminated as shown in step 114.

Figure 9:
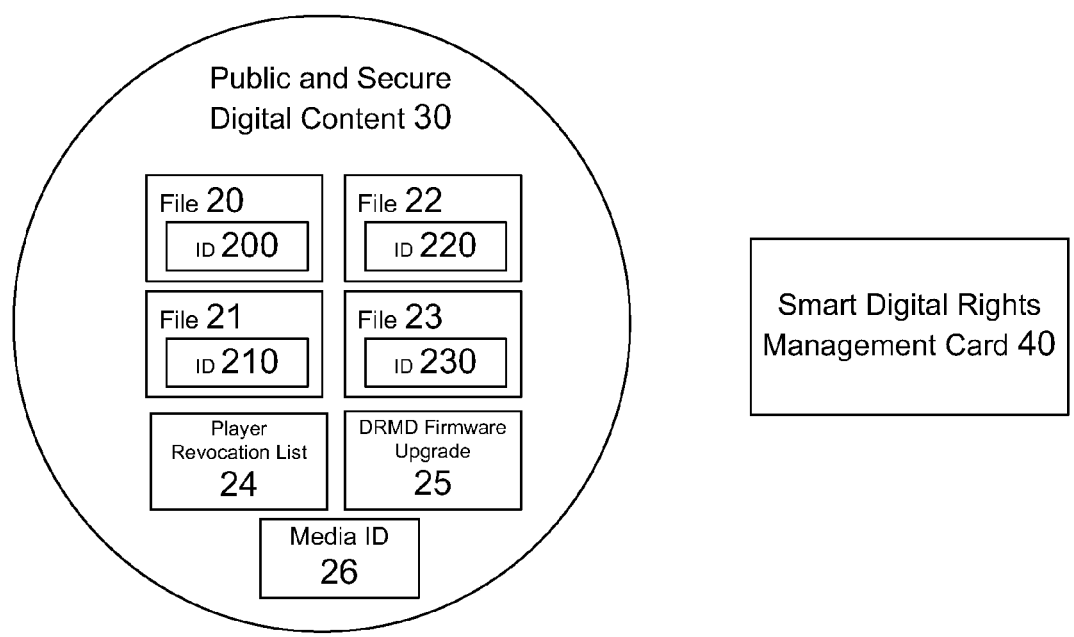
FIG. 9 shows a diagrammatic representation of a distributed public and secure digital content when provided with a smart digital rights management card in accordance with one embodiment of the present invention.

FIG. 9 shows a diagrammatic representation of a distributed public and secure digital content when provided with a smart digital rights management card in accordance with one embodiment of the present invention.

A public and secure digital content 30 contains a file 20, which contains a file identifier 200. The public and secure digital content also contains a file 21, which contains a file identifier 210. The public and secure digital content also contains a file 22, which contains a file identifier 220. The public and secure digital content also contains a file 23, which contains a file identifier 230. The public and secure digital content also contains a player revocation list 24, as described in FIG. 3. The public and secure digital content also contains a DRMD firmware upgrade 25, as described in FIG. 4. Finally, the digital content provider has assigned a media identifier 26 to the media. This identifier can be used to identify the distributed media and its content.

The public and secure digital content 30 is provided with a smart digital rights management card (SDRMC) 40. The SDRMC may already contain a digital content information data record (DRIDR) for the digital content. It may also act as a proof of purchase if the DRIDR included requires modifications by the digital content provider, in collaboration with the digital rights management authority (DRMA). The proof of purchase may be related to a DRIDR containing the right digital content decryption key for the digital content.

The SDRMC may also contain a partially filled DRIDR where the player identifier has been set to 0 but the digital content is restricted to a single digital content processing device, via the options set in the DRIDR. Then the player identifier may be directly modified by the DRMD, upon request, without requiring approval from the digital content provider, or intervention from the DRMA. This provides a right out of the box experience for a digital content restricted to a single digital content processing device.

Figure 10:
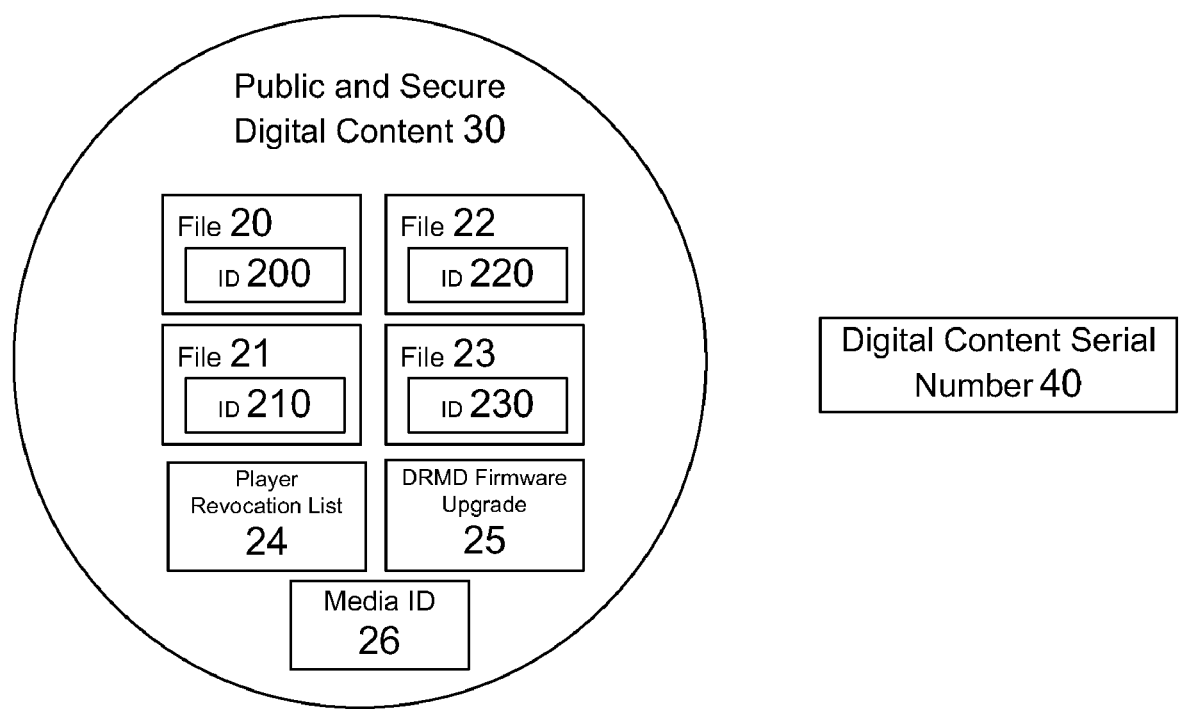
FIG. 10 shows a diagrammatic representation of a distributed public and secure digital content when provided with a digital content serial number in accordance with one embodiment of the present invention.

FIG. 10 shows a diagrammatic representation of a distributed public and secure digital content when provided with a digital content serial number in accordance with one embodiment of the present invention.

A public and secure digital content 30 contains a file 20, which contains a file identifier 200. The public and secure digital content also contains a file 21, which contains a file identifier 210. The public and secure digital content also contains a file 22, which contains a file identifier 220. The public and secure digital content also contains a file 23, which contains a file identifier 230. The public and secure digital content also contains a player revocation list 24, as described in FIG. 3. The public and secure digital content also contains a DRMD firmware upgrade 25, as described in FIG. 4. Finally, the digital content provider has assigned a media identifier 26 to the media. This identifier can be used to identify the distributed media and its content.

This public and secure digital content 30 is provided with a digital content serial number 40. The serial number may act as a proof of purchase because the public and secure digital content 30 are all alike. The serial number may then be used by the digital content provider to validate the purchase and, allow the digital rights management authority to generate a digital rights information data record inside a smart digital rights management card own by the purchaser, or inside a digital rights management device own by the purchaser.

Figure 11:
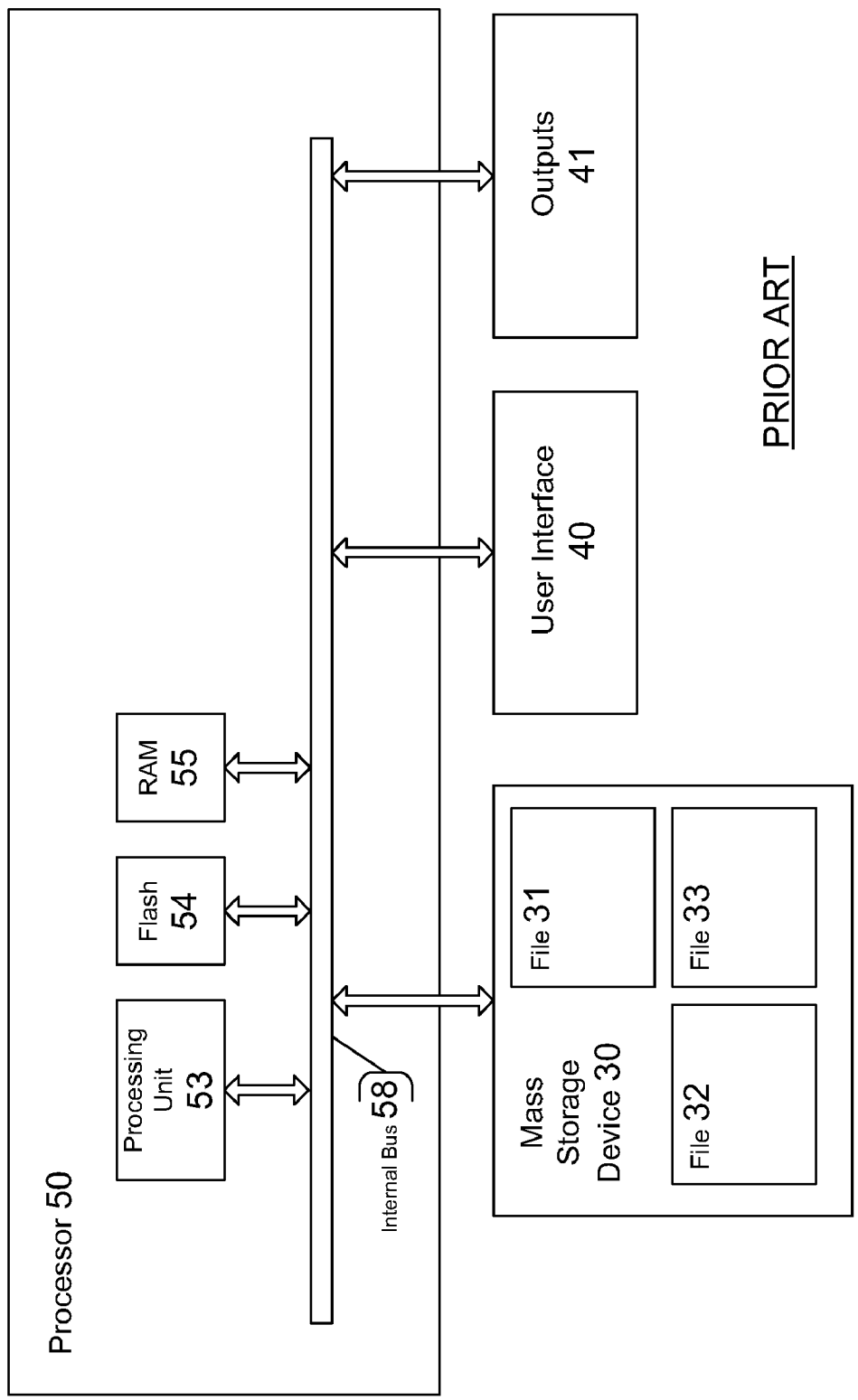
FIG. 11 shows a block diagram of a portion of a media player in accordance with a well-known design.

FIG. 11 shows a block diagram of a portion of a media player in accordance with a well-known design. A processor 50 reads a digital content and then writes it in a RAM memory 55 for further processing and then sends it to outputs 41.

A processing unit 53 manages all the interactions between the different elements of the processor 50. It runs code from a flash memory 54 and uses the RAM memory 55 to run code and to store data. It also uses an internal bus 58 to communicate with all its elements.

A mass storage device 30 is used by the media player to store large digital contents. In this diagram, mass storage device 30 contains a file 31, a file 32 and a file 33.

The files on the mass storage device are usually not encrypted but they may be encrypted. Unfortunately, if they are encrypted, they all have to use the same encryption key, known to all the media players. The encryption key has to be shared by all digital content providers and all media player manufacturers.

The media player also has a user interface 40 so that the user can interact with the device.

Figure 12:
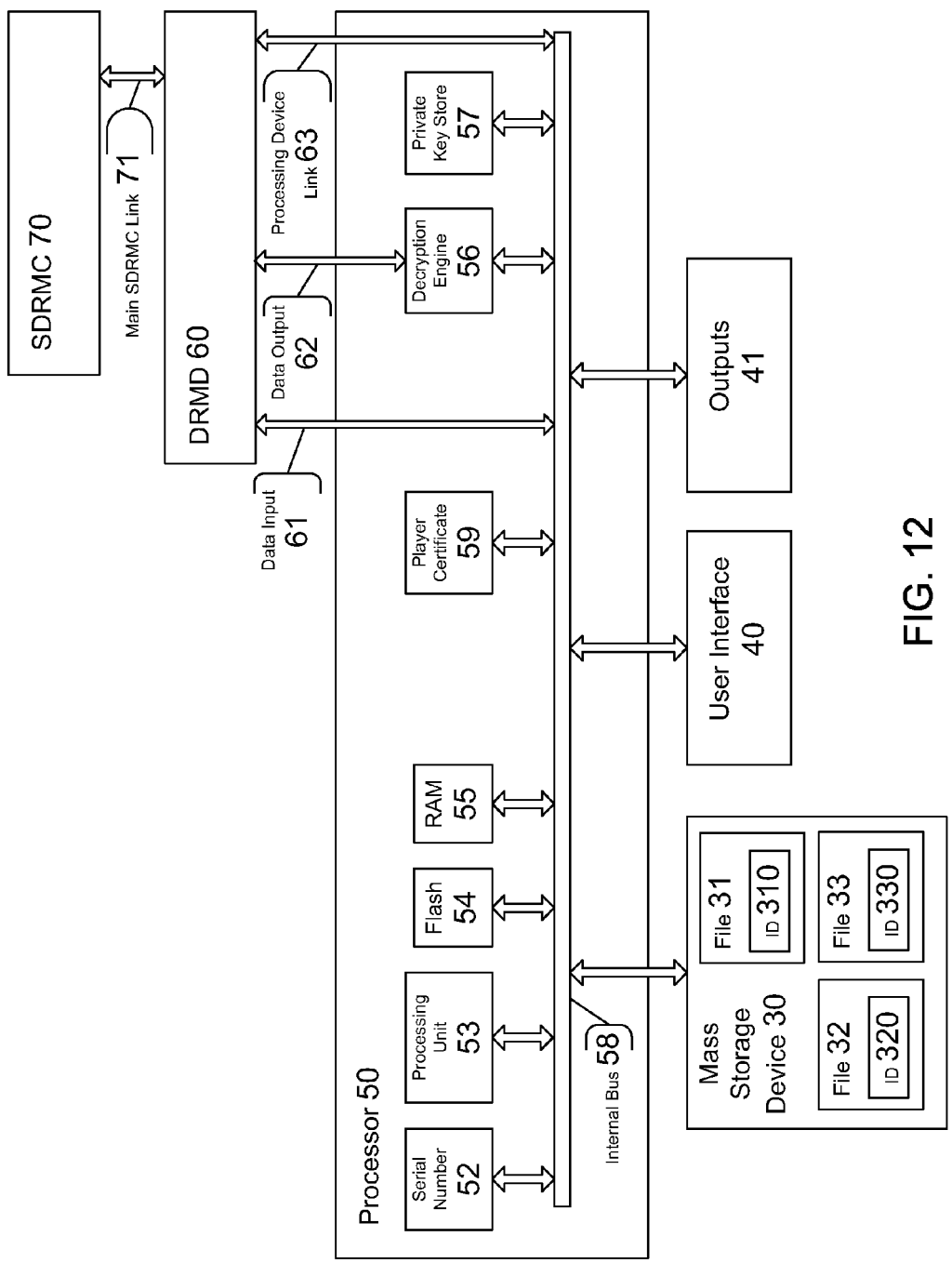
FIG. 12 shows a block diagram of a portion of a media player employing a digital rights management device and a smart digital rights management card in accordance with one embodiment of the present invention.

FIG. 12 shows a block diagram of a portion of a media player employing a digital rights management device and a smart digital rights management card in accordance with one embodiment of the present invention.

A processor 50 communicates with a digital rights management device (DRMD) 60 using a processing device link 63. The processor 50 sends a player certificate 59, to the DRMD, using the processing device link 63. The processor 50 sends encrypted digital content to the DRMD via a data input link 61 and receives newly encrypted digital content, it can decrypt, on a data output link 62. The newly encrypted digital content is decrypted, by a decryption engine 56, using the decryption key stored in a private key store 57. The digital content can then be put in a RAM memory 55 for further processing and then sent to outputs 41.

The DRMD 60 communicates securely with a smart digital rights management card (SDRMC) 70 via a main SDRMC link 71.

In a media player, the SDRMC 70 may be inserted into a smart card reader, externally accessible. This SDRMC 70 would then hold all the digital rights information data records of the digital contents allowed to play on this media player. The SDRMC 70 could then be ported to another media player to play the same digital contents. One digital rights information data record (DRIDR) could be cut from the SDRMC 70 and pasted in the internal memory of the DRMD 60. This DRIDR could later be cut from the DRMD 60 and pasted on another SDRMC.

A processing unit 53 manages all the interactions between the different elements of the processor 50. It runs code from a flash memory 54 and uses a RAM memory 55 to run code and to store data. It also uses an internal bus 58 to communicate with all its elements. A serial number 52 is also available, to the processing unit, to identify the processor 50 to the DRMA.

A mass storage device 30 is used by the media player to store large digital contents. In this diagram, mass storage device 30 contains a file 31, which contains a file identifier 310. The mass storage device also contains a file 32, which contains a file identifier 320. The mass storage device also contains a file 33, which contains a file identifier 330. Most of the files can be encrypted on the mass storage device 30.

The media player also has a user interface 40 so that the user can interact with the device.

Figure 13:
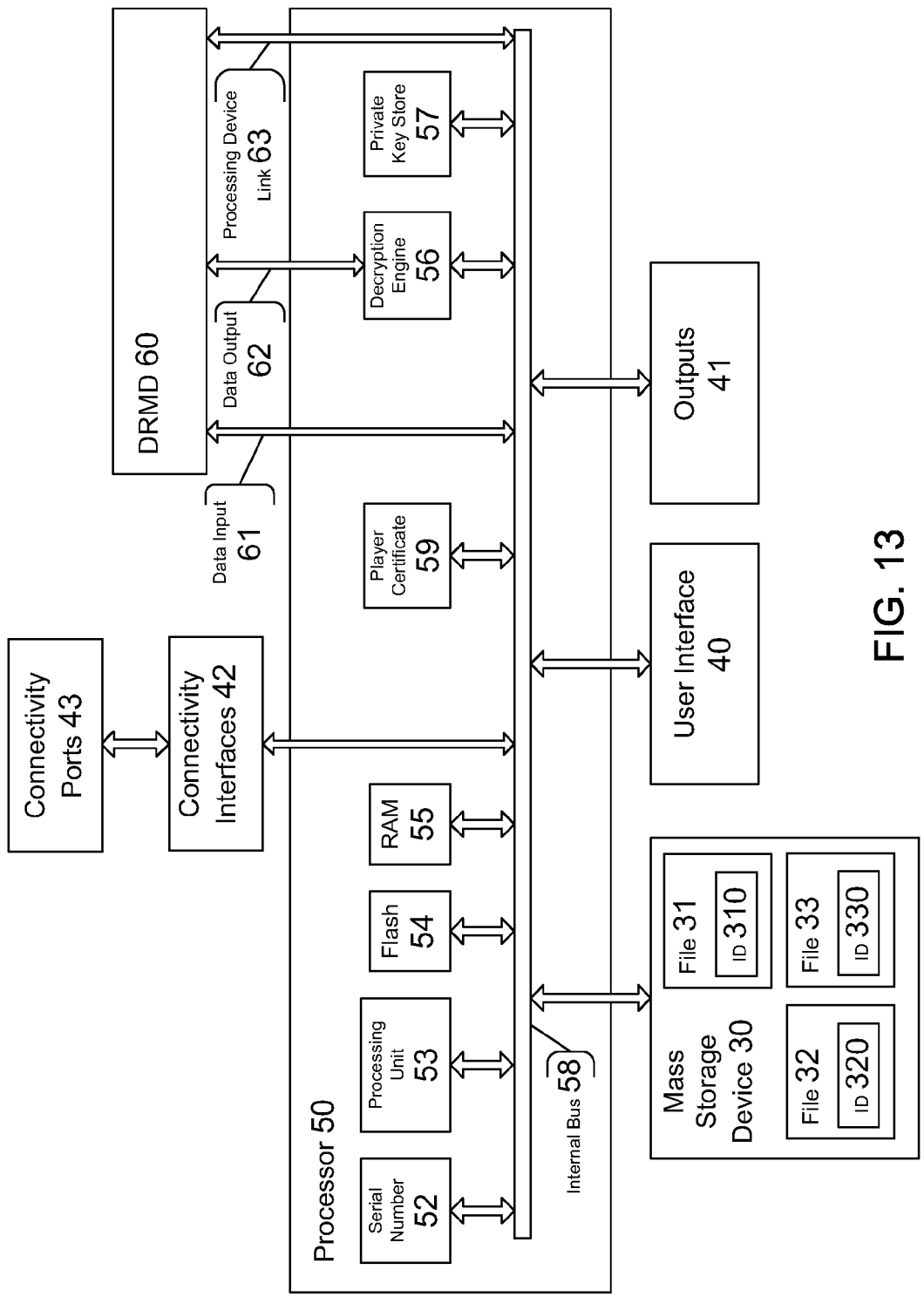
FIG. 13 shows a block diagram of a portion of a portable media player employing a digital rights management device in accordance with one embodiment of the present invention.

FIG. 13 shows a block diagram of a portion of a portable media player employing a digital rights management device in accordance with one embodiment of the present invention.

A processor 50 communicates with a digital rights management device (DRMD) 60 using a processing device link 63. The processor 50 sends a player certificate 59, to the DRMD, using the processing device link 63. The processor 50 sends encrypted digital content to the DRMD via a data input link 61 and receives newly encrypted digital content, it can decrypt, on a data output link 62. The newly encrypted digital content is decrypted, by a decryption engine 56, using the decryption key in a private key store 57. The digital content can then be put in a RAM memory 55 for further processing and then sent to outputs 41.

In a portable media player, the DRMD 60 holds all the digital rights information data records (DRIDR) of the digital contents allowed to play on this portable media player. This is to reduce the size of the portable media player. Using a link with the digital rights management authority (DRMA), via a computer link or directly, one DRIDR can be cut from the DRMD 60 and pasted on a smart digital rights management card (SDRMC) or another DRMD. Also, by using a link with the DRMA, via a computer link or directly, DRIDRs can be written to the DRMD 60 and allowed to play on this portable media player.

A processing unit 53 manages all the interactions between the different elements of the processor 50. It runs code from a flash memory 54 and uses a RAM memory 55 to run code and to store data. It also uses an internal bus 58 to communicate with all its elements. A serial number 52 is also available, to the processing unit, to identify the processor 50 to the DRMA.

Connectivity interfaces 42 allow the media player containing processor 50 to belong to a local area network, to belong to a wide area network or to have a link with a personal computer via a series of connectivity ports 43. These links may be used to exchange information with the digital content providers and the DRMA.

A mass storage device 30 is used by the media player to store large digital contents. In this diagram, mass storage device 30 contains a file 31, which contains a file identifier 310. The mass storage device also contains a file 32, which contains a file identifier 320. The mass storage device also contains a file 33, which contains a file identifier 330. Most of the files can be encrypted on the mass storage device 30.

The media player also has a user interface 40 so that the user can interact with the device.

Figure 14:
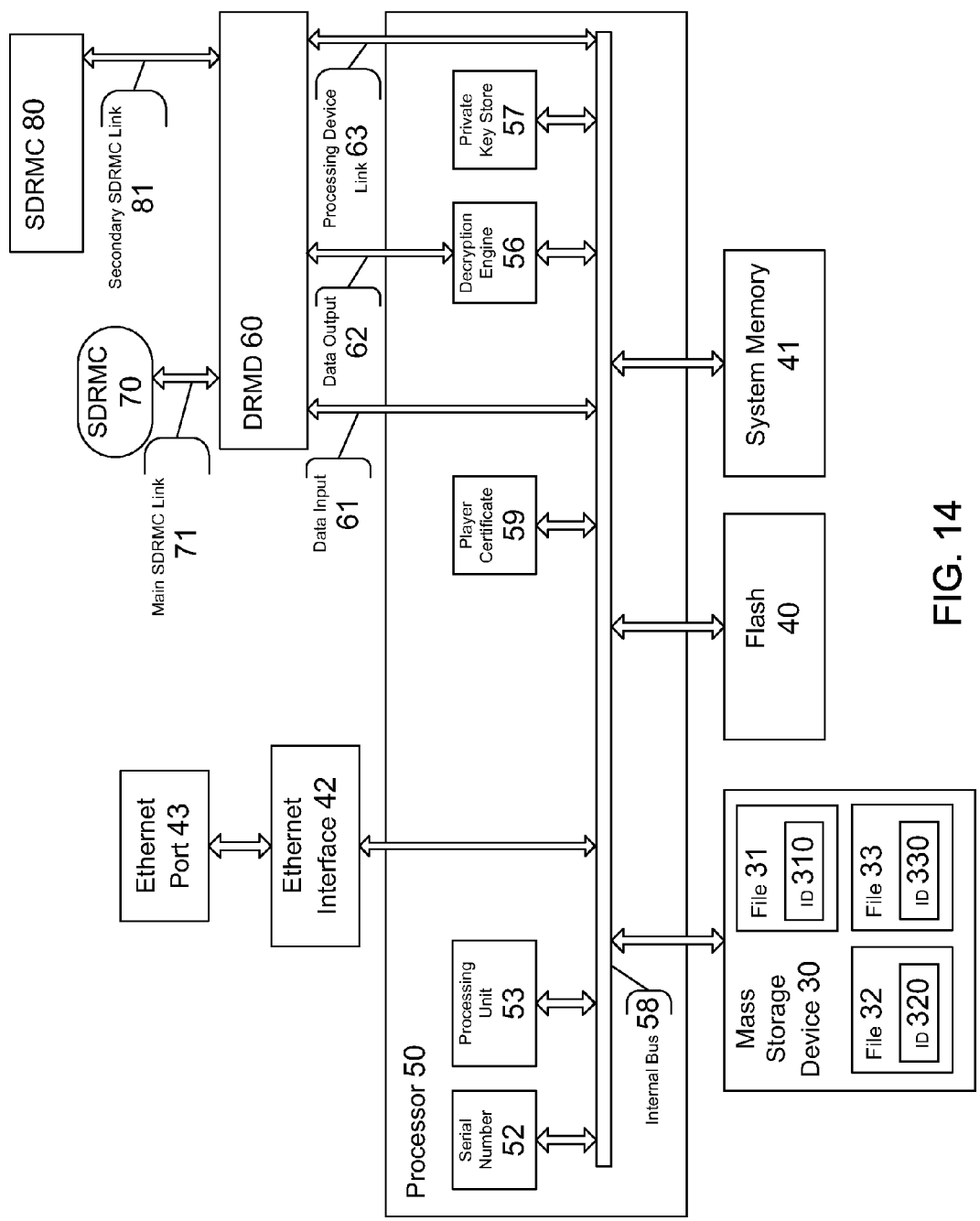
FIG. 14 shows a block diagram of a portion of a personal computer employing a digital rights management device and two smart digital rights management cards in accordance with one embodiment of the present invention.

FIG. 14 shows a block diagram of a portion of a personal computer employing a digital rights management device and two smart digital rights management cards in accordance with one embodiment of the present invention.

A processor 50 communicates with a digital rights management device (DRMD) 60 using a processing device link 63. The processor 50 sends a player certificate 59, to the DRMD, using processing device link 63. The processor 50 sends encrypted digital content to the DRMD via a data input link 61 and receives newly encrypted digital content, it can decrypt, on a data output link 62. The newly encrypted digital content is decrypted, by a decryption engine 56, using the decryption key stored in a private key store 57. The digital content can then be put in system memory 41 for processing.

The DRMD 60 communicates securely with a main smart digital rights management card (SDRMC) 70 via a main SDRMC link 71. It also communicates securely with a secondary SDRMC 80 via a secondary SDRMC link 81.

In a computer, the SDRMC 70 may have the form factor of a small format smart card like the SIM card of a cellular telephone. The SDRMC 70 would then be put in a socket directly on the computer motherboard. It would hold all the digital rights information data records of the software allowed to run on this computer. The SDRMC 70 could then be ported to a new computer, if a computer upgrade is desired.

In a computer, the SDRMC 80 may be inserted into a smart card reader, externally accessible, so that the computer can be used to manage all the SDRMCs own by the computer owner. It can also be used to physically transport digital rights management information data records from one device to another.

A processing unit 53 manages all the interactions between the different elements of the processor 50. It runs code from a flash memory 40 and uses a system memory 41 to run code and to store data. It also uses an internal bus 58 to communicate with all its elements. A serial number 52 is also available, to the processing unit, to identify the processor 50 to the DRMA.

An Ethernet interface 42 allows the computer containing processor 50 to belong to a local area network and a wide area network by using Ethernet port 43. This link may be used to exchange information with the digital content providers and the DRMA.

A mass storage device 30 is used by the computer to store large digital contents. In this diagram, mass storage device 30 contains a file 31, which contains a file identifier 310. The mass storage device also contains a file 32, which contains a file identifier 320. The mass storage device also contains a file 33, which contains a file identifier 330. Most of the files can still be encrypted on the mass storage device 30. When software, for example, is installed, most of its files remain encrypted until loaded by the processor 50. The files are only decrypted when loaded or after being loaded into the system memory 41.

Figure 15:
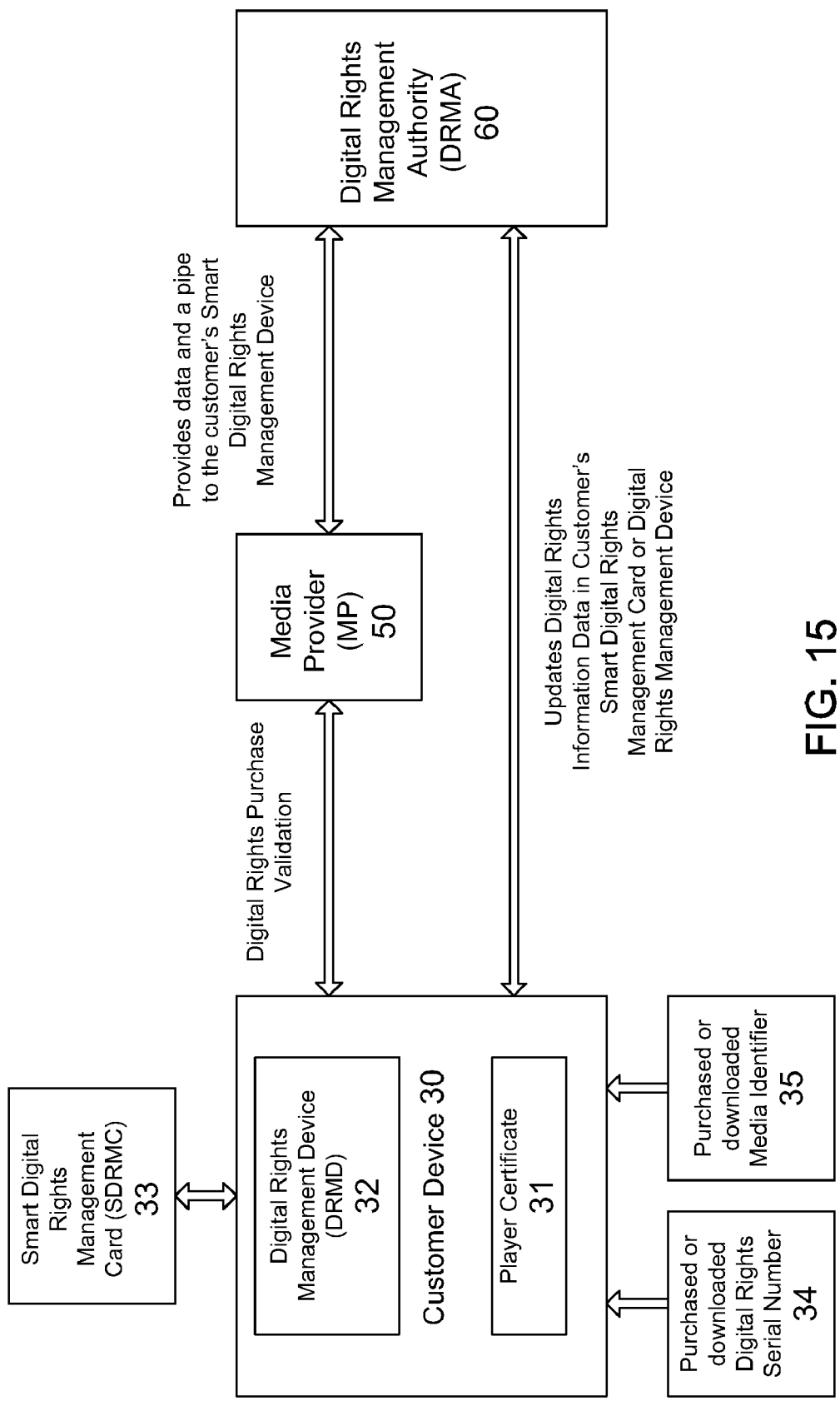
FIG. 15 shows a block diagram of the process involved when distributing public and secure digital content with a digital content serial number in accordance with one embodiment of the present invention.

FIG. 15 shows a block diagram of the process involved when distributing public and secure digital content with a digital content serial number in accordance with one embodiment of the present invention. A customer device 30 contains a digital rights management device (DRMD) 32 and a player certificate 31 provided earlier, by the digital rights management authority (DRMA), to the customer device manufacturer. A purchased or downloaded media has a media identifier 35 so that a media provider (MP) 50 can be made aware of which digital content the customer has purchased or downloaded. The customer also has, in his possession, a digital rights serial number 34 which came with the purchased or downloaded digital content. The serial number is used by the MP to validate the purchase. Since the MP is the only entity knowing the decryption key, for the digital content involved, it provides this data to the DRMA 60, along with a communication pipe to the customer digital rights management device (DRMD) 32. Since the DRMA is the only outside entity able to communicate with the smart digital rights management card (SDRMC) 33, and perform some functions on the DRMD 32, the DRMA communicates securely, with the SDRMC and the DRMD, to insert the appropriate digital rights management information data record, into the SDRMC or DRMD.

Conclusion, Ramifications and Scope

Accordingly the reader will see that, according to one embodiment of the invention, I have provided many of the advantages of this digital rights management apparatus and method.

While the above descriptions contain many specificities, these should not be construed as limitations on the scope, but rather as exemplifications of one preferred embodiment thereof.

Many other ramifications and variations are possible.

Accordingly, the scope should be determined not by the embodiments illustrated, but by the appended claims and their legal equivalents.

What is claimed is:

1. A device comprising:
    means for decrypting an encrypted digital content, using said encrypted digital content specific decryption key, said decryption key having been obtained from an external device, to produce a decrypted digital content,
    a communication link with said external device,
    means for decrypting data from said external device,
    means for encrypting said decrypted digital content, using an encryption key obtained, in an encrypted format, from a digital content processing device,
    means for decrypting said encryption key obtained in said encrypted format,
    a communication link with said digital content processing device.

2. The device of claim 1, wherein said external device communicates using encryption.

3. The device of claim 1, wherein said external device is a tamper-resistant device.

4. The device of claim 1, wherein said encrypted format is in the form of a digital certificate.

5. The device of claim 4, wherein said digital certificate is managed by a governing agency.

6. The device of claim 1, wherein said encryption key is unique to said digital content processing device.

7. The device of claim 1, wherein decrypting said encrypted digital content and encrypting said decrypted digital content is done inside a tamper-resistant device.

8. The device of claim 7, wherein said tamper-resistant device communicates with said external device using encryption, and wherein said external device is a tamper-resistant device, and wherein said encrypted format is in the form of a digital certificate, and wherein said encryption key is unique to said digital content processing device.

9. A device comprising:
    means for decrypting an encrypted digital content, using said encrypted digital content specific decryption key, said decryption key having been stored in an internal memory, to produce a decrypted digital content,
    means for encrypting said decrypted digital content, using an encryption key obtained, in an encrypted format, from a digital content processing device,
    means for decrypting said encryption key obtained in said encrypted format,
    a communication link with said digital content processing device.

10. The device of claim 9, wherein said encrypted format is in the form of a digital certificate.

11. The device of claim 10, wherein said digital certificate is managed by a governing agency.

12. The device of claim 9, wherein said encryption key is unique to said digital content processing device.

13. The device of claim 9, wherein decrypting said encrypted digital content and encrypting said decrypted digital content is done inside a tamper-resistant device.

14. The device of claim 13, wherein said tamper-resistant device obtains said encryption key, in said encrypted format, in the form of a digital certificate, and wherein said encryption key is unique to said digital content processing device.

15. A method for managing digital rights, comprising the steps of:
    selecting a digital content for digital rights management,
    selecting an identification number for said digital content,
    associating said identification number to said digital content,
    selecting an encryption key for said digital content,
    associating said encryption key to said digital content,
    associating said identification number to said encryption key,
    encrypting said digital content using said encryption key associated with said digital content, to produce a secure digital content,
    distributing said secure digital content with said identification number,
    providing a decryption key for said secure digital content, in a secure container,
    decrypting said secure digital content using said decryption key to produce a decrypted digital content,
    obtaining, in an encrypted format, a digital content processing device encryption key,
    encrypting said decrypted digital content with said digital content processing device encryption key to produce an encrypted digital content for said digital content processing device,
    providing said encrypted digital content, for said digital content processing device, to said digital content processing device.

16. The method of claim 15, wherein said secure container communicates using encryption.

17. The method of claim 15, wherein said encrypted format is in the form of a digital certificate.

18. The method of claim 15, wherein said digital content processing device encryption key is unique to said digital content processing device.

19. The method of claim 15, wherein decrypting said secure digital content and encrypting said decrypted digital content is done inside a tamper-resistant device.

20. The method of claim 19, wherein said tamper-resistant device communicates with said secure container using encryption, and wherein said encrypted format is in the form of a digital certificate, and wherein said digital content processing device encryption key is unique to said digital content processing device.

* * * * *